United States Patent [19]

Koide et al.

[11] Patent Number: 4,583,212
[45] Date of Patent: Apr. 15, 1986

[54] RECORD/PLAYBACK HEAD POSITIONING DEVICE FOR OPTICAL DISC APPARATUS

[75] Inventors: Hiroshi Koide, Sagamihara; Junichi Watanabe, Yokohama, both of Japan

[73] Assignee: Ricoh Company, Ltd., Tokyo, Japan

[21] Appl. No.: 522,126

[22] Filed: Aug. 11, 1983

[30] Foreign Application Priority Data

Aug. 13, 1982 [JP] Japan ................................ 57-140555
Dec. 14, 1982 [JP] Japan ................................ 57-218782

[51] Int. Cl.[4] ............................................. G11B 3/36
[52] U.S. Cl. ................................ 369/219; 360/105; 360/106; 369/221
[58] Field of Search .............. 369/221, 219; 360/86, 360/106, 105, 104

[56] References Cited

U.S. PATENT DOCUMENTS

| | | | |
|---|---|---|---|
| 3,940,149 | 2/1976 | Nagamura | 369/219 |
| 4,037,252 | 7/1977 | Janssen | 369/219 |
| 4,046,386 | 9/1977 | Gosling et al. | 369/249 |
| 4,260,162 | 4/1981 | Morii et al. | 369/219 |
| 4,323,997 | 4/1982 | Kuribayashi et al. | 369/219 |
| 4,382,293 | 5/1983 | Tajima et al. | 369/221 |
| 4,453,243 | 6/1984 | Tanaka et al. | 369/221 |

*Primary Examiner*—Steven L. Stephan
*Attorney, Agent, or Firm*—David G. Alexander

[57] ABSTRACT

An optical disc recording and playback apparatus has a record/playback head adapted to write data into and read them out of information tracks formed on a rotatable optical disc. A carriage carrying the head therewith is driven by a linear motor in the radial direction of the disc perpendicular to the tracks, and then stopped and held at a desired track position. Thereafter, a tracking control is performed by allowing the head to move in the radial direction within a predetermined range.

15 Claims, 16 Drawing Figures

RECORD/PLAYBACK HEAD POSITIONING DEVICE FOR OPTICAL DISC APPARATUS

BACKGROUND OF THE INVENTION

The present invention relates to a data recording and playback apparatus having a record/playback head which writes various information into and reads them out of tracks formed in an optical disc, magnetic disc or like rotary disc. More particularly, the present invention relates to a positioning device capable of moving the record/playback head along the surface of a disc to accurately position it relative to a desired track on the disc for the purpose of recording or playing back data.

A major achievement in the realm of recording and playback technology today may be optical discs which were evolved from video discs. In fact, there have been developed optical disc apparatuses which use various kinds of optical discs such as audio discs, mass image files and disc memories for large capacity computers, in addition to video discs.

Usually, an optical disc for use with an optical disc apparatus is formed on its surface with a number of concentric information tracks in order to record and playback various information. To write or read information into or out of such an information track, a disc is rotated and a record/playback head is moved radially of the disc for a tracking control. For the tracking control, the record/playback head has to move with an accuracy which is at least on the order of submicrons. Such an accuracy of head movement is indispensable due to the fact that pits in adjacent tracks on the disc surface are spaced by microns, that is, an accuracy higher than this is needed for precise tracking. Meanwhile, it is necessary to move the record/playback head in the radial direction of the disc in the course of the tracking control and, therefore, to reduce the dimensions of the whole head.

A prior art record/playback head carries therewith optics which usually includes an object lens. During the tracking control, the object lens is displaced not only in the focal direction but also in the radial direction. The radial movement of the object lens, however, tends to effect the optical axis of the optics and thereby increase the error while data is written into or read out of the disc. This limits the allowable displacement of the object lens in the radial direction and thereby requires the disc itself to be produced with a significant accuracy to minimize its eccentricity.

In light of this, there has been proposed and already put to practical use a system which moves optics with an object lens bodily in the radial direction, instead of the object lens only. In a record/playback head driven under such an alternative control, the object lens needs only to move along the optical axis of the optics, or in the focal direction, effectively eliminating displacement of the optical axis.

However, in order to attain an accurate tracking control by the radial movement of the whole optics on the head, not only a carriage supporting the head has to be assembled with accuracy, but also a mechanism for driving the carriage in the radial direction has to be highly accurate. Typical of such drive mechanisms heretofore known is one which employs tracks or rails extending in the radial direction of a disc along which a record/playback head moves. A carriage is movably supported by the tracks through linear bearings. Again, the linear bearings have to be machined with an accuracy of the order of submicrons in order to achieve accurate tracking control. Additionally, such a drive mechanism is not fully acceptable due to the problems concerned with the assembly of the linear bearings on the tracks, scratches or wear tending to occur on their interengaged surfaces, etc.

SUMMARY OF THE INVENTION

It is therefore an object of the present invention to provide a record/playback head positioning device for a data recording apparatus which allows a record/playback head, adapted to write various information into and read them out of a track formed on an optical, magnetic or like rotary disc, to move to be accurately positioned at a desired track position.

It is another object of the present invention to provide a record/playback head positioning device which is capable of performing accurate tracking control with a record/playback head for writing various information into and reading them out of information tracks on an optical disc of an optical disc apparatus.

It is another object of the present invention to provide a record/playback head positioning device for an optical disc apparatus which allows a record/playback head to move readily and accurately to a desired track position even if the allowable eccentricity of the tracks on the disc is relatively large.

It is another object of the present invention to provide a record/playback head positioning device for an optical disc apparatus which performs an accurate tracking control, trims production costs and has a simple construction.

It is another object of the present invention to provide a record/playback head positioning device for an optical disc apparatus which is capable of performing an accurate tracking control with a record/playback head, without resorting to any bulky drive mechanism.

It is another object of the present invention to provide a generally improved record/playback head positioning device for an optical disc apparatus.

A device for positioning a record/playback head which writes data into and reads the data out of tracks formed on a rotary disc, and is movable in the radial direction of the disc perpendicular to the tracks for a tracking control of the present invention comprises a carriage for mounting the head thereon, drive means for driving the carriage in the radial direction, carriage stop and hold means for stopping the movement of the carriage at a selected track position and hold the carriage thereat, and head retainer means for retaining the head while allowing the head to move within a predetermined range on the carriage in a tracking control which occurs after the carriage is stopped and held in the selected track position.

In accordance with the present invention, an optical disc recording and playback apparatus has a record/playback head adapted to write data into and read them out of information tracks formed on a rotatable optical disc. A carriage carrying the head therewith is driven by a linear motor in the radial direction of the disc perpendicular to the tracks, and then stopped and held at a desired track position. Thereafter, a tracking control is performed by allowing the head to move in the radial direction within a predetermined range.

The above and other objects, features and advantages of the present invention will become apparent from the following detailed description taken with the accompanying drawings.

DESCRIPTION OF THE PREFERRED EMBODIMENTS

While the record/playback head positioning device of the present invention is susceptible of numerous physical embodiments, depending upon the environment and requirements of use, substantial numbers of the herein shown and described embodiments have been made, tested and used, and all have performed in an eminently satisfactory manner.

Figure 1:
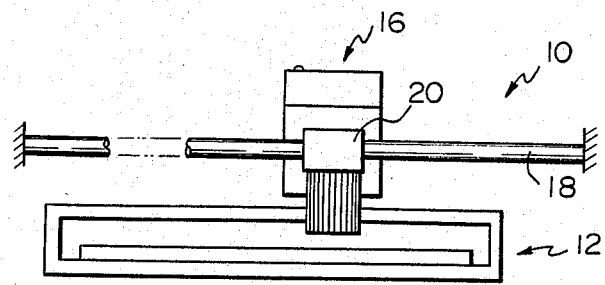
FIG. 1 is a side elevation of a prior art record/playback head positioning device for an optical disc apparatus.

To facilitate understanding of the present invention, a brief reference will be made to a prior art head positioning device, shown in FIG. 1. The head positioner includes a motor 12 which drives a head 16 in a reciprocal movement along a rod 18 through a linear bearing 20. The head 16 carries an optical arrangement or optics therewith. This prior art head positioner, however, can not attain the desired accurate tracking unless the linear bearing 20 is furnished with an accuracy as high as the order of submicrons, as previously mentioned. Difficulty has therefore been experienced in realizing or maintaining acceptable degree of performance, due to the problems concerned with the assembly of the movable system, wear of the rod 18, etc.

The present invention is successful to eliminate the drawbacks described above and will now be described with reference to FIGS. 2-16.

Figure 2:
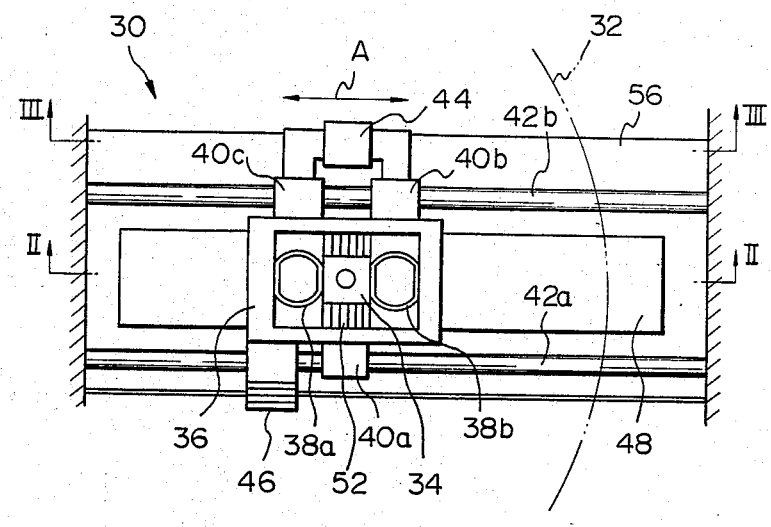
FIG. 2 is a plan view of a record/playback head positioning device embodying the present invention.

Referring to FIG. 2, a head positioning device embodying the present invention is shown and generally designated by the reference numeral 30. The device 30 is arranged parallel to the radial direction of a rotary disc 32, i.e. access direction indicated by an arrow A. Connected to the device 30, a head 34 is capable of linear movement in the access direction A. The head 34 is mounted on a frame-shaped carriage 36, or first support member, through second support members 38a and 38b, each of which comprises an annular spring. A linear bearing 40a is mounted on one side of the carriage 36 while linear bearings 40b and 40c are mounted on the other side opposite to the linear bearing 40a. A pair of parallel tracks or rails 42a and 42b extend parallel to the access direction A. The linear bearings slidably rest on these tracks, the bearing 40a on the track 42a and the bearings 40b and 40c on the track 42b. A stop and hold device 44 is associated with the linear bearings 40b and 40c to selectively bring the carriage 36 into and maintain it in a stop. A head position sensor 46 is mounted on the carriage 36.

Figure 3:
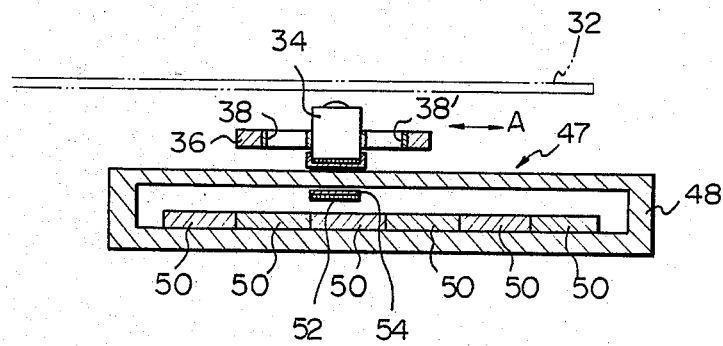
FIG. 3 is a section along line II—II of FIG. 2.

In this particular embodiment, the head positioner 30 employs a movable coil type linear motor 47 as shown in FIG. 3. A yoke 48 constitutes a magnetic circuit and, as shown in FIG. 2, forms a closed loop. A predetermined number of permanent magnets 50 are arranged linearly in a lower portion of the yoke 48, while a movable coil 52 wound around a bobbin 54 is engaged in an upper portion of the yoke 48. The bobbin 54 is made of aluminum, for example, and is connected to the head 34, so that the head 34 may be movable in the access direction A when the coil 52 is energized. In detail, any movement of the head 34 caused by the motor 47 will be transferred to the carriage 36 through the second support member 38a (38b) which comprises an annular spring preloaded in the access direction A. Stated another way, the head 34 is resiliently held in a floating condition relative to the carriage 36 by the second support members 38.

Figure 4:
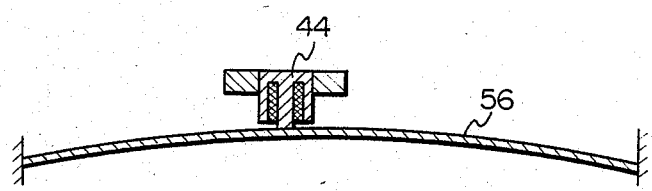
FIG. 4 is a section along line III—III of FIG. 2.

As shown in FIG. 4, the stop and hold device 44 comprises an electromagnet coactive with a plate 56 which is made of a magnetic material and installed parallel to the access direction A. When the electromagnet is energized, the plate 56 will become attracted into contact with the electromagnet. Thus, the device 44 serves to positively stop the movement of the carriage 36 and maintain it in the stopped position until deactivated. A member made of a non-magnetic material, such as phosphor bronze, is carried on one of the interengagable surfaces of the plate 56 and electromagnet, so that residual magnetic flux may be prevented from effecting smooth separation of the two members. Alternatively, a rubber plate or like elastic member may be carried on the surface concerned for the purpose of damping initial vibrations due to magnetic attraction.

Figure 5:
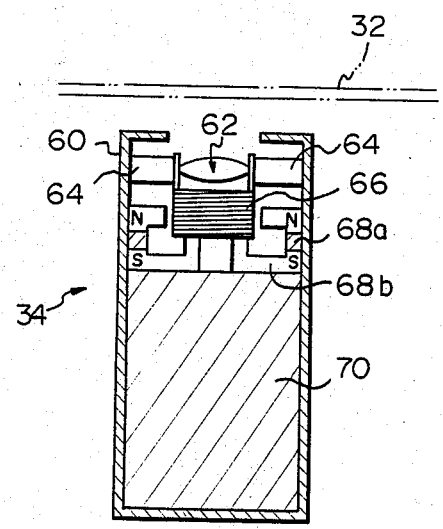
FIG. 5 is a section of a record/playback head in the construction of FIG. 2.

Referring to FIG. 5, an exemplary structure of the head 34 is shown and includes a casing 60. A lens cell 62 is installed in the casing 60 to face an information track on the disc 32. The lens cell 62 is movably fixed to the casing 60 by leaf springs 64. A coil 66 is positioned below the lens cell 62 and effected by a magnetic circuit which is made up of a permanent magnet 68a and a yoke 68b. The coil 66, magnet 68a and yoke 68b constitute a focus control section in combination which is adapted to move the lens cell 62 in the vertical direction for focusing purpose. Optics 70 is also installed in the casing 60 below the magnetic circuit in order to detect optical information picked up by the lens cell 62.

Figure 6:
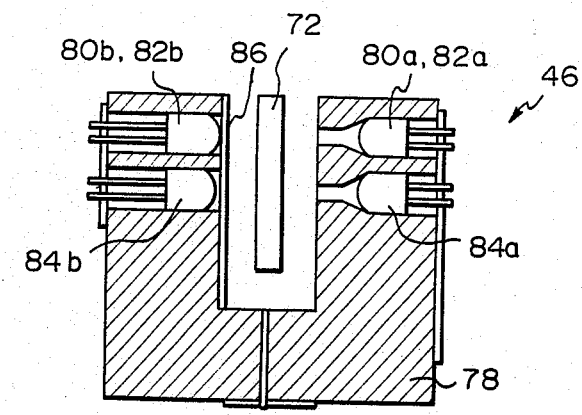
FIG. 6 is a section of a head position sensor included in the construction of FIG. 2.
Figure 7:
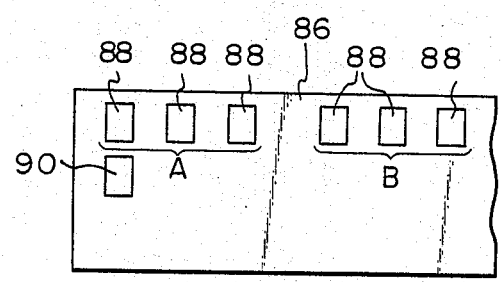
FIG. 7 is a fragmentary front view of a light intercepting plate included in the head position sensor shown in FIG. 6.
Figure 8:
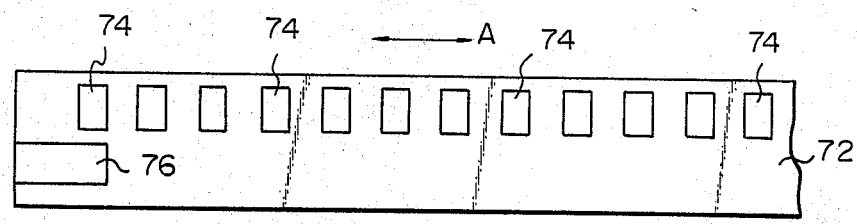
FIG. 8 is a fragmentary front view of a slotted plate included in the head position sensor of FIG. 6.

Referring to FIGS. 6-8, a construction of the head position sensor 46 applicable to the present invention is shown. The head position sensor 46 operates in combination with a slotted plate 72 which comprises a thin insulative member. As shown in FIG. 8, the plate 72 formed with a train of slots 74 in an upper portion thereof in correspondence with information tracks on the disc 32, and a slot 76 in an end portion thereof for defining a home position of the head 34.

In FIG. 6, the head position sensor 46 comprises a base portion 78 having a generally U-shaped section so as to surround the slot plate 72 from below. That is, the slotted plate 72 is received in the recess or channel defined by three inner walls of the U-shaped base portion 78. One of the opposite upright inner walls of the base portion 78 is provided with two horizontally spaced light emitting elements 80a and 82a in an upper portion thereof, and a light emitting element 84a below the light emitting elements 80a and 82a. The other upright inner wall is provided with two light receiving elements 80b and 82b respectively paired with the light emitting elements 80a and 82a, and a light receiving element 84b paired with the light emitting element 84a. The paired light emitting and receiving elements 80a, 80b, 82a and 82b are assigned for the detection of a track position, and the paired light emitting and receiving elements 84a and 84b for the detection of the home position. The upright inner wall with the light receiving elements 80b 82b and 84b is covered by a light intercepting plate 86. As shown in detail in FIG. 7, the plate 86 is formed with a train of slots 88 for track detection and a slot 90 for home position detection, in correspondence with the slotted plate 72. The slots 88 in the plate 86 are formed in two groups, A and B, which are shifted in phase by $\pi/2$ relative to each other, so that light beams issuing from the light emitting elements 80a and 82a will reach their associated light receiving elements 80b and 82b via the slots 74 in the plate 72 and the slot groups A and B in the plate 86, respectively. As a result, the light receiving elements 80b and 82b will supply a control circuit, which will be described, with their outputs which differ $\pi/2$ in phase from each other. Meanwhile, the light beam from the light emitting element 84a will be passed through the slot 76 in the plate 72 and the slot 90 in the plate 86 when the head 34 is in its home position. The light receiving element 84b will deliver its output in response to the light beam from the element 84a.

Figure 9:
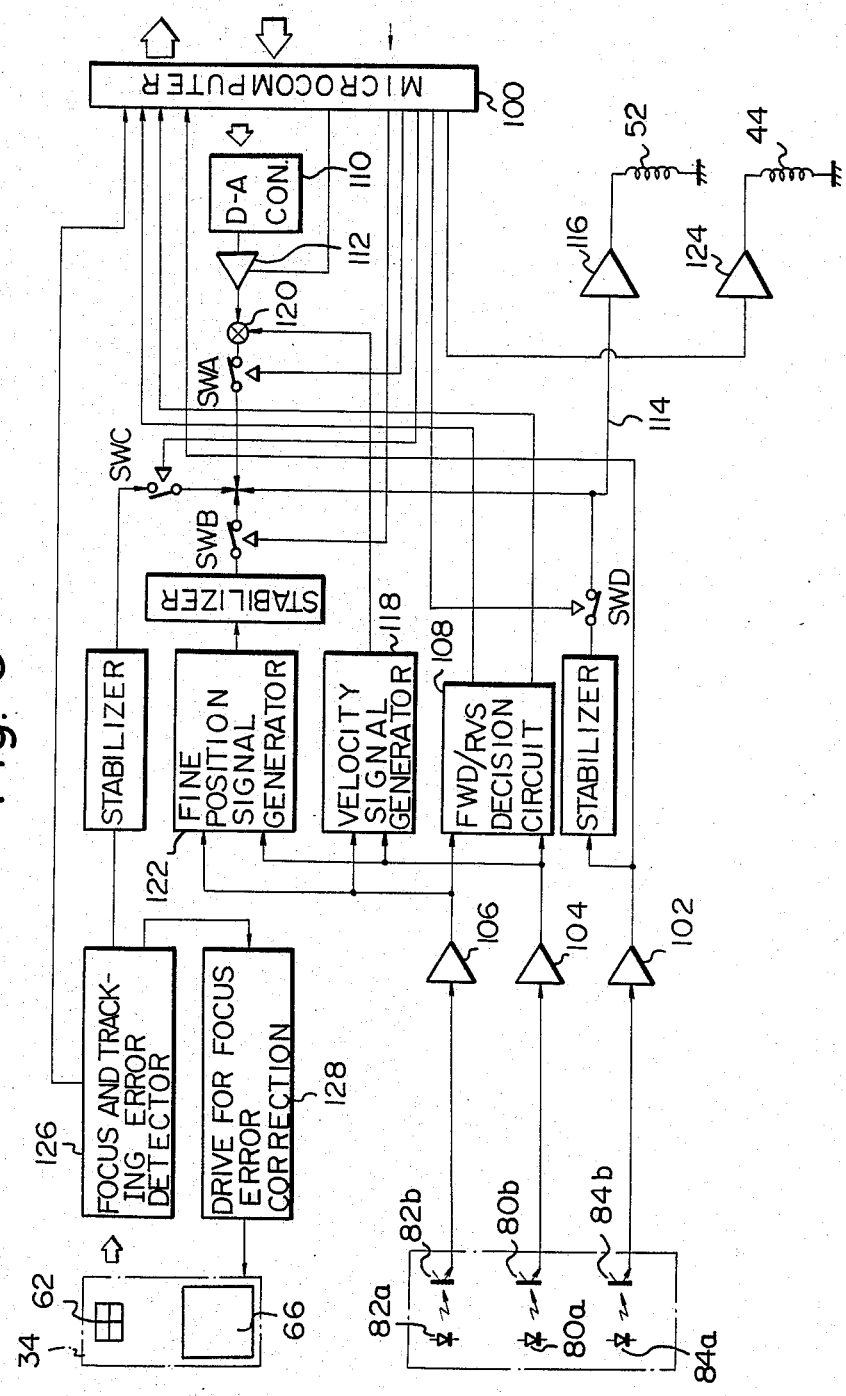
FIG. 9 is a block diagram showing an example of a control circuit adapted to control the displacement of the positioner of FIG. 2.
Figure 10:
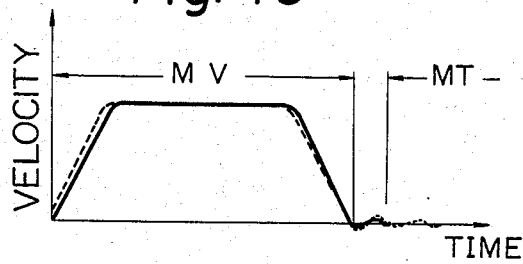
FIG. 10 is a diagram of control modes selectively employed by the positioner of FIG. 2.

Referring to FIG. 9, an example of the control circuit mentioned above is shown. In the initial state of operation, a microcomputer 100 turns on a switch SWD and calculates a distance between a present position of the head 34 and a desired or target track. For example, if the head 34 is in the home position, the output of the light receiving element 84b is fed to the microcomputer 100 via a detector circuit (amplifier) 102 to inform it of the presence of the head at the home position. When the head 34 is in a position other than the home position, the light receiving elements 80b and 82b supply a forward/reverse decision circuit 108 with a track position detection signal and a $\pi/2$ phase deviation signal via detectors 104 and 106, respectively. In response to these inputs, the decision circuit 108 generates forward or reverse rotation pulses which the microcomputer 100 counts to determine the present head position. Depending on the distance between the present and target head positions, the microcomputer 100 moves the head 34 as indicated by a velocity pattern MV shown in FIG. 10. As will be described in sequence, head movement control is effected generally in either one of two different modes, velocity control mode MV and tracking mode MT as shown in FIG. 10.

In the velocity control mode MV, a switch SWA is turned on so that a velocity control pattern command is fed to the movable coil 52 via a digital-to-analog (D/A) converter 110, an amplifier 112, the switch SWA, a signal line 114 and a servo amplifier 116. Then, the head 34 is shifted to a target position in accordance with the velocity control pattern MV. The force acting on the movable coil 52 is transmitted from the head 34 to the carriage 36 via the annular spring 38. Here, the movement of the carriage 36 (solid line in FIG. 10) occurs later than the movement of the head 34 (dotted line in FIG. 10) due to the resiliency of the annular spring 38 as well as inertia. Receiving track position detection outputs of the detectors 104 and 106, a velocity signal generator 118 delivers an actual velocity signal to an adder 120. Therefore, the signal fed to the movable coil 52 via the line 114 represents a difference between the command from the mocrocomputer 100 and the actual velocity. The outputs of the detectors 104 and 106 are also supplied to a fine positioning signal generator 122 which then controls the movable coil 52 by delivering a control signal to the servo amplifier 116 via a switch SWB and the line 114, thereby bringing the carriage 36 to the target position. In the meantime, the microcomputer 100 maintains the switch SWA turned off.

On the arrival of the head 34 (or carriage 36) at the target position, the microcomputer 100 turns off the switch SWB. In this situation wherein the switches SWA, SWB and SWD are off and the switch SWC is on, the control enters the tracking mode MT and the microcomputer 100 supplies the servo amplifier 124 with a stop and hold signal to energize the electromagnet of the stop and hold device 44. This causes the electromagnet 44 to attract the plate 56 whereby the carriage 36 becomes fixed in place. At this instance, the carriage 36 undergoes a certain magnitude of vibration while the head undergoes a larger magnitude of vibration due to the resiliency of the annular springs 38 (FIG. 10). To damp this vibration, the annular springs 38a and 38b may be individually covered with vibration preventing members or they may comprise leaf springs made of resin which well damps vibrations. On the lapse of a predetermined time in the tracking mode MT, tracking control will continue within a target accuracy.

In the tracking mode MT, data picked up by the lens cell 62 is fed to a focus and tracking error detector 126 which then supplies a drive circuit 128 for focus error correction with a focus error signal. The drive circuit 128 supplies a control signal to the coil 66 of the focus control section to correctly control the focus. The detector 126 also generates a tracking error signal which is routed to the movable coil 52 via a stabilizing circuit and the switch SWC, line 114 and servo amplifier 116. This allows the head 34 to move delicately relative to the then stationary carriage 36 within the resiliency range of annular springs 38, thereby attaining accurate tracking operation.

To summarize the operation described above, the linear motor 47 is operated to apply a force for movement to the head 34 so that the carriage 36 is moved together with the head roughly to a desired tracking position. Thereafter, the stop and hold device 44 is actuated to stop the movement of the carriage 36 at the tracking position. Under this condition, only the head is delicately movable while being controlled to follow the information track.

As will be seen from the above, the head positioner shown and described is operable for both the rough access of the head and the tracking after fixing of the head. This eliminates the need for the conventional bulky drive source and insures accuracy of operation. Due to the inherent construction, what is required for the support structure is only a bearing whose accuracy is just enough for the rough access and not any particular structure, promoting easy production and cutdown in cost.

Figure 11:
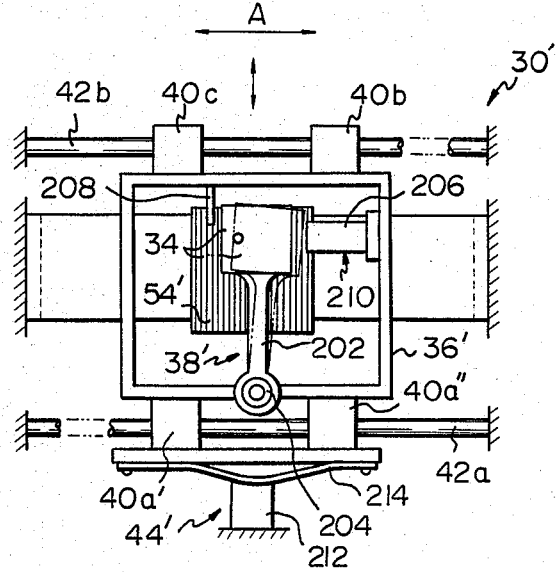
FIG. 11 is a plan view of a second embodiment of the present invention.
Figure 12:
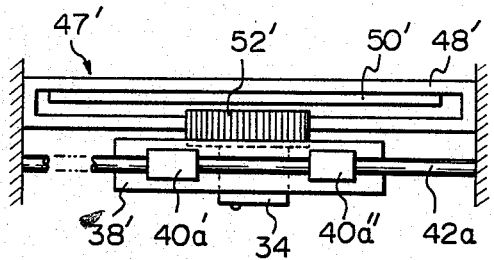
FIG. 12 is a side elevation of the positioner shown in FIG. 11.

Referring to FIGS. 11 and 12, a second embodiment of the present invention is shown, in which the same structural elements as those of the first embodiment are designated by the same reference numerals. The head positioner, generally 30', has a second support member 38' which comprises an arm 202 and bearing 204 this time. The head 34 is supported by a first support member or carriage 36' through the second support member 38'. The second support member 38' is free to pivot relative to the first support member or carriage 36'. A first stop and hold device 210 for stopping the pivotal movement of the head 34 is mounted on the carriage 36' and comprises a flat electromagnet 206. A stop 208, adapted to define a movable range of the head 34, places the head 34 within an effective range of a magnetic field developed by the electromagnet 206, thereby allowing the electromagnet 206 to quickly hold the head 34 is position.

Again, the head 34 in FIGS. 11 and 12 is driven by a linear motor 47' in the radial direction of the disc, i.e. access direction A. The linear motor 47' comprises a movable coil 52', a yoke 48' and magnets 50'. Also, the head 34 comprises a lens cell arrangement and optics as in the first embodiment shown and described. Linear bearings 40'a, 40"a, 40b and 40c are mounted on laterally opposite sides of the carriage 36'. Tracks or rails 42a and 42b extend parallel to each other in the access direction A. The linear bearings 40'a and 40"a slidably rest on the track 42a, and the linear bearings 40b and 40c on the track 42b. A second stop and hold device 44' is mounted on the linear bearings 40'a and 40"a to selectively stop the movement of the carriage 36' and hold it in the stopped position. The second stop and hold device 44' comprises an electromagnet 212 and a thin yoke member 214 mounted on the carriage 36'. When energized, the electromagnet 212 will attract the yoke 214 to maintain the carriage 36' unmovable.

During an access operation for moving the head 34 to the vicinity of a target track on the disc, the first stop and hold device 210 is actuated to hold the head 34 in the position indicated by a phantom line in FIG. 11, in which the pivotal movement of the head is inhibited. As the linear motor 47' is energized, the carriage 36' is moved along the tracks 42a and 42b entraining the coil 52' and head 34. In the course of this seek operation, the second stop and hold device 44' is kept deenergized to prevent the yoke 214 from being attracted onto the electromagnet 212, so that the carriage 36' is free to reciprocate along the tracks 42a and 42b.

The second stop and hold device 44' is constracted to become operative as soon as the head 34 reaches the target position, that is, after the seek or access operation. The, the electromagnet 212 attracts the yoke 214 thereonto to hold the carriage 36'. At this instant, the first stop and hold device 210 is made inoperable. This makes the head 34 free to pivot through the bearing 204 for tracking the disc.

The tracking control described above is employed to compensate for eccentricity of a track. Because the compensation width is not more than about 300 microns, the bearing portion does not move any substantial angle and is, therefore, hardly effected by fluctuations which may occur in the rotating direction of the bearing. That is, pivotal movement of the optical pickup is hardly effected by undulation in the sliding part of the bearing or the like.

In the third embodiment described, the use of a flat electromagnet for the stop and hold mechanism realizes a fast holding function and thereby significantly shortens the access time for an optical disc.

Figure 13:
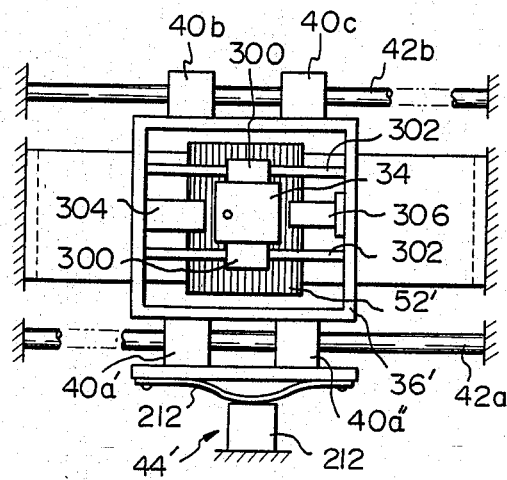
FIG. 13 is a plan view of a third embodiment of the present invention.

Referring to FIG. 13, a fourth embodiment of the present invention is shown. The head 34 in FIG. 13 is connected to a coil 52' and supported by a carriage 36' through a second support member, which comprises mechanical precision linear bearings 300 which are slidably seated on tracks or rails 302. Also included in the construction of FIG. 13 are a stop 304 and a flat electromagnet 306 for holding the head 34 in the course of the access operation.

As seen from the above description and the drawing, the head 34 of the fourth embodiment is not pivoted but designed for linear reciprocation and use is made of precision slide bearings 300 to achieve a tracking control of the order of submicrons. Although the linear bearings 40'a, 40"a, 40b and 40c used for access operation is subjected to impact on starts and stops of the movement due to the fast access, tending to cause wear in the tracks 42a and 42b, tracking operation does not entail such impact and, for this reason, the use of precision linear bearings suffices for the head. The stop 304 in FIG. 13 is exactly the same as the stop 208 of the second embodiment concerning the function.

Figure 14:
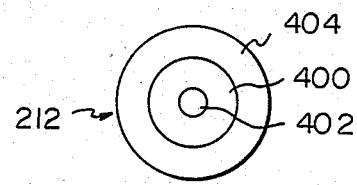
FIG. 14 is a plan view of a first stop and hold device included in the construction shown in FIG. 11 or 13.
Figure 15:
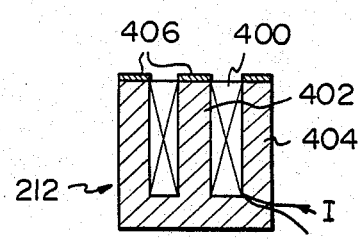
FIG. 15 is a section of the stop and hold device shown in FIG. 14.

Shown in FIGS. 14 and 15 is an example of the flat electromagnet 212 which has been shown and described in conjunction with the second or third embodiment of the pesent invention. The electromagnet 212 comprises a coil 400, center yoke 402, a yoke 404 and the like. As shown in FIG. 15, flat members 406 made of a non-magnetic material are layed on the top of the electromagnet 212.

Figure 16:
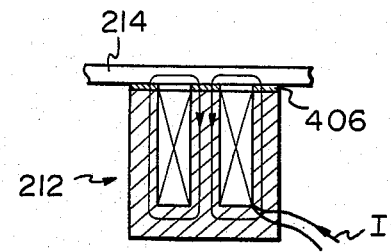
FIG. 16 is a view of the stop and hold device of FIG. 15 which is shown in a position for attracting a yoke.

In FIG. 16, as a current I is supplied to the flat electromagnet 212, magnetic paths are completed as illustrated to develop a predetermined magnitude of attraction whereby the electromagnet 212 attracts the yoke 214. On the interruption of the current supply to the electromagnet 212, the non-magnetic plate 406 will prevent the yoke 214 from tending to remain in contact with the electromagnet due to the residual magnetic flux. That is, the yoke 214 is caused to move away from the electromagnet 212 as soon as the electromagnet 212 is deenergized.

In summary, it will be seen that the present invention provides a positioning device for a record/playback head which allows the head to perform accurate tracking operation regardless of the accuracy of movement of its associated carriage. This is because the head is movable for tracking independently of the carriage. What is required for the optics is merely to move an object lens and the like in the focal direction, promoting the ease of assembly of the head. Furthermore, in contrast to the prior art system wherein only the object lens is moved, the system of the present invention which bodily moves the head eliminates the problem of misalignment of the optical axis of the optics and thereby accommodates a larger eccentricity in the tracks of a photodisc.

It will be apparent to those skilled in the art that the device in accordance with the second or third embodiment shown and described may employ the head position detector and control of the first embodiment.

Various modifications will become possible for those skilled in the art after receiving the teachings of the present disclosure without departing from the scope thereof.

What is claimed is:

1. A device for positioning a record/playback head which writes data into and reads data out of tracks formed on a rotary disc and is movable in the radial direction of the disc perpendicular to the tracks for a tracking control, said device comprising:

a carriage for mounting the head thereon;

drive means for driving said head in the radial direction;

carriage stop and hold means for stopping the movement of the carriage at a selected track position and holding the carriage thereat; and head retainer means for retaining the head on the carriage such that the carriage is movable by and together with the head while the carriage is not stopped and held, the head being movable independently within a predetermined range in a tracking control which occurs while the carriage is stopped and held in said selected track position;

the drive means comprising a movable coil type linear motor.

2. The device as claimed in claim 1, further comprising means for sensing a position of the head relative to selected track.

3. The device as claimed in claim 1, in which the drive means further comprises linear bearing means integrally mounted on the carriage, and track or rail means on and along which the carriage is slidable in the radial direction through said linear bearing means.

4. The device as claimed in claim 1, the carriage stop and hold means comprises an electromagnet integrally mounted on the carriage, and a magnetic plate mounted on a stationary member of the device to extend parallel to the radial direction.

5. The device as claimed in claim 4, in which a vibration preventing member is fixed to a surface of the magnetic plate.

6. The device as claimed in claim 5, in which the vibration preventing member comprises a rubber plate.

7. The device as claimed in claim 1, in which the carriage stop and hold means comprises an electromagnet fixed to a stationary member of the device, and a yoke member integrally mounted on the carriage.

8. The device as claimed in claim 1, in which the head retainer means comprises spring means.

9. The device as claimed in claim 8 in which the spring means comprises a pair of annular springs.

10. The device as claimed in claim 9 in which a vibration preventing member is fit on a surface of each of the annular springs.

11. The device as claimed in claim 8, in which the spring means comprises a leaf spring made of resin which well damps vibration.

12. The device as claimed in claim 1, in which the head retainer means comprises a head support member which is pivotable in the radial direction.

13. The device as claimed in claim 12, in which the head retainer means further comprises head support member stop means for stoping a pivotal movement of the head support member.

14. The device as claimed in claim 13, in which the head support member stop means comprises a stop member.

15. The device as claimed in claim 14, in which the head support member stop means further comprises an electromagnet.

* * * * *